United States Patent
Hirose et al.

(10) Patent No.: US 11,827,222 B2
(45) Date of Patent: Nov. 28, 2023

(54) ABNORMALITY DETECTION APPARATUS AND ABNORMALITY DETECTION METHOD

(71) Applicant: Nissan Motor Co., Ltd., Kanagawa (JP)

(72) Inventors: Satoru Hirose, Kanagawa (JP); Toru Takagi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 587 days.

(21) Appl. No.: 16/972,466

(22) PCT Filed: Jun. 4, 2018

(86) PCT No.: PCT/JP2018/021336
§ 371 (c)(1),
(2) Date: Dec. 4, 2020

(87) PCT Pub. No.: WO2019/234788
PCT Pub. Date: Dec. 12, 2019

(65) Prior Publication Data
US 2021/0269034 A1 Sep. 2, 2021

(51) Int. Cl.
*B60W 50/12* (2012.01)
*B60W 30/18* (2012.01)
*B60W 50/14* (2020.01)

(52) U.S. Cl.
CPC ...... *B60W 30/18109* (2013.01); *B60W 50/12* (2013.01); *B60W 50/14* (2013.01); *B60W 2050/146* (2013.01); *B60W 2510/18* (2013.01)

(58) Field of Classification Search
CPC .......... B60W 30/18109; B60W 50/12; B60W 50/14; B60W 2050/146; B60W 2510/18
See application file for complete search history.

(56) References Cited

U.S. PATENT DOCUMENTS

| | | |
|---|---|---|
| 9,739,323 B2 | 8/2017 | Shintani |
| 2015/0224646 A1 | 8/2015 | Benali et al. |
| 2015/0233433 A1 | 8/2015 | Shintani |

FOREIGN PATENT DOCUMENTS

| | | |
|---|---|---|
| CN | 205607641 U | 9/2016 |
| JP | S63290935 A | 11/1988 |
| JP | 2000309258 A | 11/2000 |
| JP | 2004123270 A | 4/2004 |
| JP | 2005257630 A | 9/2005 |
| JP | 2008292288 A | 12/2008 |
| JP | 2014-101945 A | 6/2014 |

*Primary Examiner* — Mathew Franklin Gordon
(74) *Attorney, Agent, or Firm* — Osha Bergman Watanabe & Burton LLP

(57) ABSTRACT

An abnormality detection apparatus detects an abnormality of equipment according to sensor data that is related to a vibration of the equipment and is obtained while a brake device for braking a motion of a movable part of the equipment is in operation.

11 Claims, 9 Drawing Sheets

ABNORMALITY DETECTION APPARATUS AND ABNORMALITY DETECTION METHOD

TECHNICAL FIELD

The present invention relates to an abnormality detection apparatus and an abnormality detection method.

BACKGROUND ART

There is a disclosed related art that determines an abnormal vibration of a brake device according to a signal from a torque sensor or pressure sensor that detects a brake force of the brake device, and if detects an abnormal vibration, reduces a pressure of the brake device, thereby suppressing the abnormal vibration.

CITATION LIST

Patent Literature

Patent Literature 1: Japanese Unexamined Patent Application Publication No. 2000-309258

SUMMARY OF INVENTION

Problems to be Solved by Invention

The above-mentioned related art is one that detects an abnormality of a brake device itself according to a vibration and is not one that detects an abnormality of equipment itself on which the brake device is installed.

The present invention has been made in consideration of the above-mentioned problem and an object thereof is to provide an abnormality detection apparatus and an abnormality detection method, capable of detecting an abnormality of equipment itself on which a brake device is installed.

Means to Solve Problems

An abnormality detection apparatus according to an aspect of the present invention detects an abnormality of equipment according to sensor data related to a vibration of the equipment and obtained during operation of a brake device that brakes a motion of a movable part in the equipment.

Effects of Invention

According to the present invention, it is possible to detect an abnormality of equipment in which a brake device is arranged.

MODE OF IMPLEMENTING INVENTION

With reference to the drawings, embodiments will be explained. In descriptions of the drawings, the same parts are represented with the same reference marks to omit their explanations.

Figure 1:
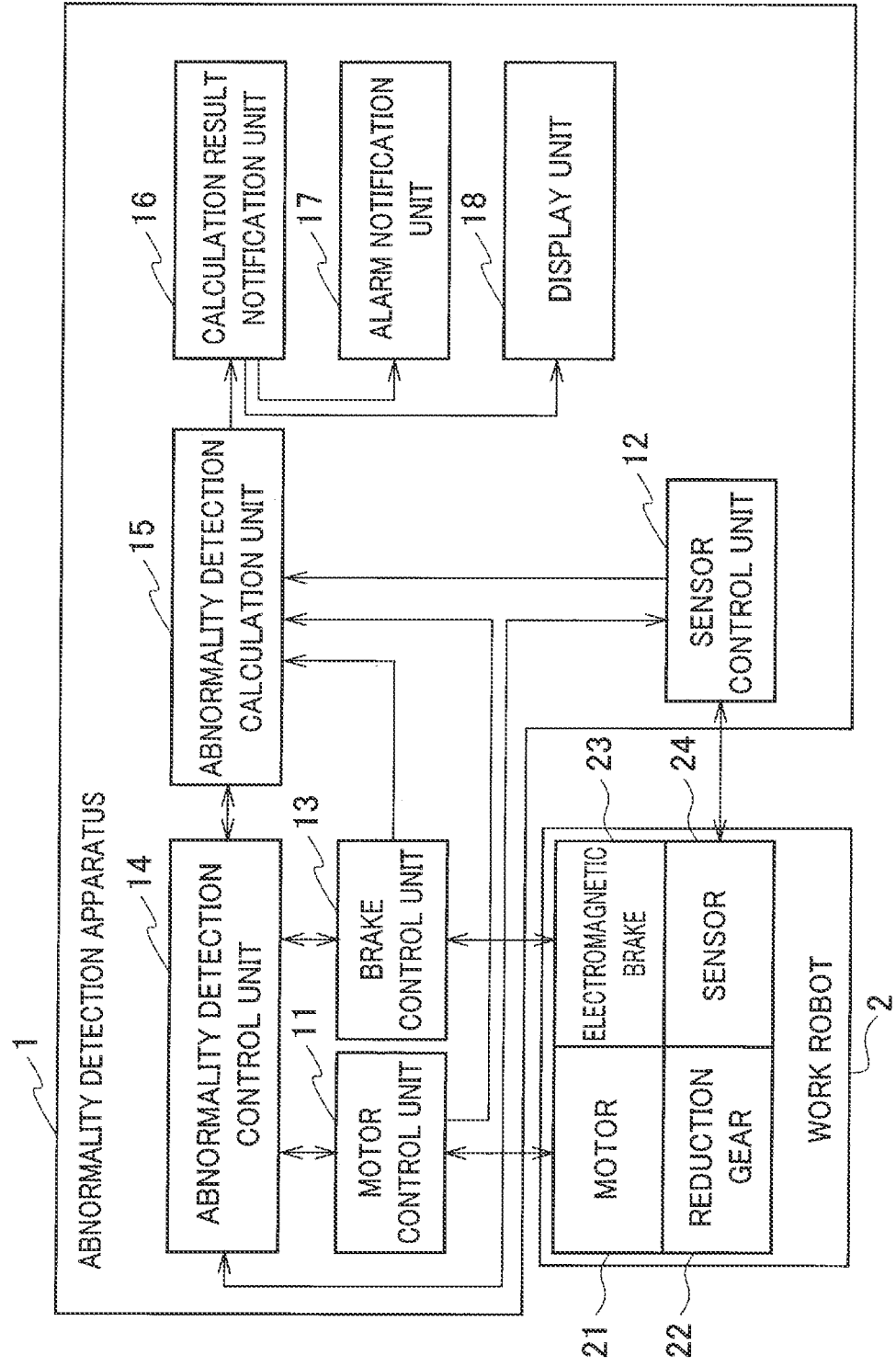
FIG. 1 is a view illustrating a configuration of an abnormality detection apparatus according to an embodiment and a work robot as a detection object.

FIG. 1 is a view illustrating a configuration of an abnormality detection apparatus according to an embodiment and a work robot that is a detection object.

The abnormality detection apparatus 1 is one that detects an abnormality of equipment and detects an abnormality of, for example, the work robot 2 that is a multiaxis machine for assembling a vehicle and is abnormality detection objective equipment. The abnormality detection apparatus 1 and work robot 2 are arranged in, for example, a production site.

The work robot 2 includes a motor 21 for generating a drive force to move a movable part of the work robot 2, a reduction gear 22 for reducing a rotation speed of the motor 21 to convert a torque of the motor 21 into a higher torque so that an arm or the like of the work robot 2 may move an object of large load, and an electromagnetic brake 23 attached to the motor 21. The motor 21 and reduction gear 22 have rotation parts, and therefore, may be called as a rotation mechanism.

The work robot 2 includes an arm rotation axis on which the motor 21, reduction gear 22, and electromagnetic brake 23 are arranged. One rotation axis and the motor 21 and reduction gear 22 arranged thereon are generally referred to as a movable part.

The movable part is a part that is able to move and may include an arm or other parts. Although the movable part in the above example is a rotation mechanism part that rotates, it is not limited to the one that rotates but it may be one that moves along a locus of straight or curved line. Hereunder, the movable part is deemed as including the motor 21 and reduction gear 22 and is referred to as the rotation mechanism part.

The electromagnetic brake 23 is a brake device to brake a motion of the rotary mechanism part. Here, the electromagnetic brake 23 is arranged for the motor 21 and brakes a motion of the motor 21. The electromagnetic brake 23 is arranged for, for example, an emergency stop of the arm or a fall prevention of the arm and brakes the motor 21 at the time of, for example, emergency, thereby stopping the arm connected through the reduction gear 22.

Also, the electromagnetic brake 23 operates when the arm is not moved for a predetermined time (for example, one minute) or longer, to prevent a fall of the arm.

For example, when the motor 21 is energized and a brake force is applied through the reduction gear 22 to the arm, the arm does not move or fall.

However, if the motor 21 is deenergized to be freely rotatable, there is a risk that the arm falls due to its own weight. Accordingly, if the arm is not moved for the predetermined time or longer, the electromagnetic brake 23 prevents the rotation of the motor 21, thereby preventing the arm from falling.

The electromagnetic brake 23 may be provided for the reduction gear 22. With this, the electromagnetic brake 23 brakes a motion of the reduction gear 22, and as a result, is able to urgently stop the arm and prevent the arm from falling.

With the reduction gear 22, more precisely, in the vicinity of the reduction gear 22, there is arranged a sensor (vibration sensor) 24 for detecting the magnitude of a mechanical vibration of the reduction gear 22. The sensor 24 detects, for example, acceleration as a vibration magnitude of the part for which the sensor 24 is arranged and outputs in real time a vibration signal indicating the detected vibration magnitude.

The sensor 24 is not limited to the acceleration detection sensor but it may be a sensor for detecting, for example, a speed or displacement of the part, thereby detecting a vibration magnitude. For example, a piezoelectric sensor, an angular speed sensor, a gyrosensor, or any kind of sensor capable of providing attitudinal changes in time series may be employable.

The abnormality detection apparatus 1 includes a motor control unit 11, a sensor control unit 12, a brake control unit 13, an abnormality detection control unit 14, an abnormality detection calculation unit 15, a calculation result notification unit 16, an alarm notification unit 17, and a display unit 18.

In the abnormality detection apparatus 1, the motor control unit 11, sensor control unit 12, brake control unit 13, abnormality detection control unit 14, abnormality detection calculation unit 15, and calculation result notification unit 16 in the abnormality detection apparatus 1 are generally called as a controller and are realizable with the use of a microcomputer having a CPU (central processing unit), a memory, and an input/output portion. A computer program (an abnormality detection program) for functioning the microcomputer as the controller is installed in and executed by the microcomputer. With this, the microcomputer functions as the plurality of information processing parts (11 to 16) of the controller.

The example explained here realizes the controller with software. However, it is naturally possible to prepare exclusive hardware that executes the information processing to form the controller. The exclusive hardware includes application specific integrated circuits (ASICs) and conventional devices such as electronic circuits and electronic components that are arranged to execute functions mentioned in the embodiments. Also, the plurality of information processing parts (11 to 16) included in the controller may be formed with discrete hardware pieces. Further, the controller may also serve as a controller for controlling the work robot 2.

The controller detects an abnormality of the equipment (2) according to sensor data related to a vibration of the equipment (2) and obtained from the vibration sensor (24) provided for the equipment (2). More precisely, the controller detects an abnormality of the equipment (2) according to sensor data obtained during the operation of the brake device (23).

The motor control unit 11 conducts the operation start, operation stop, and rotation speed increase/decrease of the motor 21. Under the control of the motor control unit 11, the motor 21 moves the arm to a predetermined position through the reduction gear 22. With this, work by the arm is enabled.

The sensor control unit 12 controls the sensor 24, obtains a vibration signal outputted from the sensor 24, and outputs the vibration signal to the abnormality detection calculation unit 15.

The brake control unit 13 conducts the operation start, operation stop, and increase/decrease of a brake force of the electromagnetic brake 23. The brake control unit 13 operates the electromagnetic brake 23 in emergency as mentioned above, thereby stopping the arm. Also, the brake control unit 13 operates the electromagnetic brake 23 when the arm is not moved for a predetermined time or longer, thereby preventing the arm from falling.

The brake control unit 13 provides the electromagnetic brake 23, while operating the electromagnetic brake 23, with a brake control signal having, for example, a fixed frequency such as of 50 Hz to 100 Hz as an operation frequency.

The electromagnetic brake 23 includes, for example, a contact relay, a coil energized by the contact relay, and a metal member movable with magnetism generated by the coil and repeats ON/OFF of the contact relay at the operation frequency. With this, the metal member is repeatedly moved at the operation frequency. As a result, the electromagnetic brake 23 applies to the reduction gear 22 a vibration whose vibration frequency is the same as the operation frequency. Namely, the electromagnetic brake 23 functions as a vibration applier. According to the embodiment, a vibration necessary for an abnormality detection is generated in such a way, and therefore, it is possible to intentionally control and operate the electromagnetic brake 23.

As one application technique, for example, the reduction gear 22 is made of a plurality of parts and a gap between the parts widens due to abrasion or bite to reduce a frictional force and most absorb (decrease the amplitude of) a vibration (a characteristic vibration) of a specific frequency band. Accordingly, the abrasion or bite of the reduction gear 22 is most reflected on the frequency of the characteristic vibration, and therefore, it is preferable to use this frequency as the operation frequency.

Similarly, when bolts and nuts at fixing portions of parts loosen, an external vibration is absorbed or a resonance is caused, and therefore, it is preferable to identify a given frequency according to the size, material, loosened quantity of each part and determine the operation frequency.

Also, if one reduction gear 22 involves two or more characteristic vibration frequencies, it is preferable to use any one of the frequencies as the operation frequency. For example, there will be a case that a characteristic vibration frequency (called a frequency fA) corresponding to a part (called a part 22A) contained in the reduction gear 22 and a characteristic vibration frequency (called a frequency fB) corresponding to another part (called a part 22B) contained in the reduction gear 22 differ from each other. In this case, when conducting an abnormality detection of the part 22A, it is preferable to use the frequency fA as the operation frequency, and when conducting an abnormality detection of the part 22B, it is preferable to use the frequency fB as the operation frequency.

The frequency or frequency band of a characteristic vibration is obtainable by calculation. For example, the frequency band is calculable with the use of specification values including the size or the number of gears of the reduction gear 22 and a rotation speed at the time of operation.

The brake control unit 13 makes the operation frequency of the brake control signal agree with the characteristic vibration frequency, thereby enabling the electromagnetic brake 23 to vibrate so as to most reduce vibration. Naturally, the operation frequency may not be agreed with the characteristic vibration frequency. For example, it may be a characteristic vibration sideband frequency or may be a fixed operation frequency without regard to the movable part or reduction gear.

The abnormality detection control unit 14 detects an abnormality of the reduction gear 22 by issuing instructions to the motor control unit 11, sensor control unit 12, and brake control unit 13 and controls states of the motor 21, reduction gear 22, and electromagnetic brake 23. Further, the abnormality detection control unit 14 obtains states of the motor 21, reduction gear 22, and electromagnetic brake 23 via the motor control unit 11, sensor control unit 12, and brake control unit 13.

The abnormality detection calculation unit 15 obtains, during operation of the electromagnetic brake 23, information from the abnormality detection control unit 14, motor control unit 11, sensor control unit 12, and brake control unit 13. For example, the unit 15 obtains a vibration signal of the sensor 24 from the sensor control unit 12. Then, according to sensor data taken out of the obtained vibration signal, the unit 15 detects an abnormality of the equipment.

For example, if a vibration magnitude (amplitude) of the vibration signal, i.e., the sensor data is smaller than a predetermined threshold value, it is considered that a parts gap of the reduction gear is widened due to abrasion or bite to reduce a frictional force and absorb the vibration. In this case, it is determined to be abnormal.

On the other hand, if the vibration amplitude (sensor data) is equal to or greater than the threshold value, it is considered that the gap is narrow not to absorb vibration but to enlarge the amplitude. In this case, it is determined to be normal.

The calculation result notification unit 16 notifies, through the alarm notification unit 17 or the display unit 18, a worker of a result calculated by the abnormality detection calculation unit 15.

The alarm notification unit 17 employs, if the rotation mechanism part of the work robot 2 is determined to be abnormal, a revolving light, a buzzer, or any other device to notify a production site worker or watchman, or a maintenance person for maintaining the work robot 2 (generally called a worker) of the abnormality (issue an alarm).

The display unit 18 displays in real time the result calculated by the abnormality detection calculation unit 15 including the result whether or not the rotation mechanism part is abnormal. For example, the unit 18 is a liquid crystal display.

First Embodiment

Figure 2:
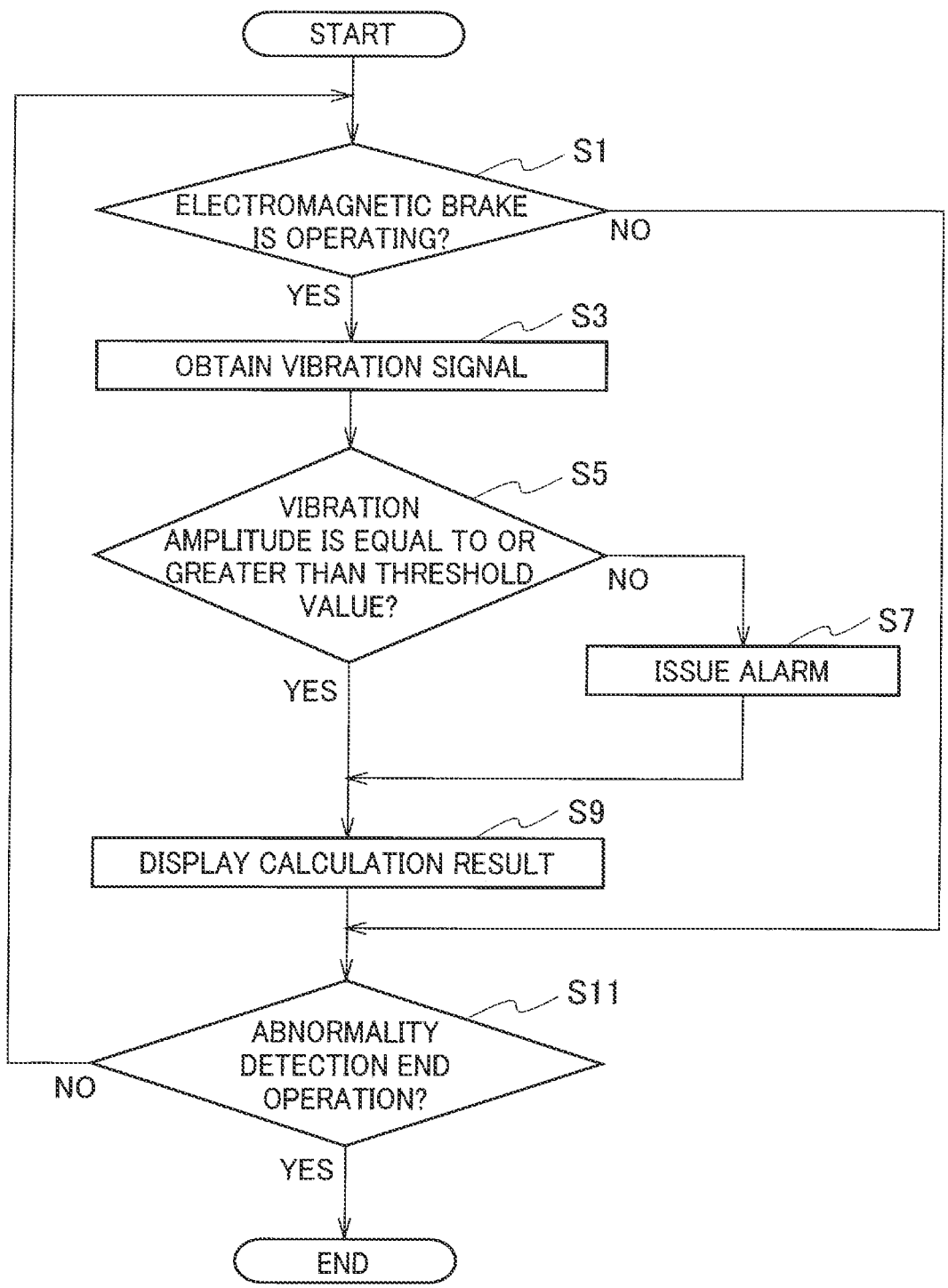
FIG. 2 is a flowchart illustrating an operation of the abnormality detection apparatus 1 according to a first embodiment.

An operation of the abnormality detection apparatus 1 according to the first embodiment will be explained with reference to a flowchart of FIG. 2. The abnormality detection apparatus 1 executes an abnormality detection method as illustrated in FIG. 2.

According to the first embodiment, it is determined whether or not the electromagnetic brake 23 is in operation, and if in operation, the abnormality detection is carried out.

First, the abnormality detection control unit 14 obtains, from the brake control unit 13, a state of the electromagnetic brake 23, and based on that, determines whether or not the electromagnetic brake 23 is operating (S1).

If the abnormality detection control unit 14 determines that the electromagnetic brake 23 is operative (S1: YES), the electromagnetic brake 23 is applying a vibration to the motor 21, and therefore, the unit 14 operates the sensor 24 through the sensor control unit 12 and the abnormality detection calculation unit 15 obtains a vibration signal outputted from the sensor 24 (S3).

It is also possible to make the abnormality detection control unit 14 beforehand instruct the sensor control unit 12 to operate the sensor 24 when the electromagnetic brake 23 is operative, and based on this, the abnormality detection calculation unit 15 may obtain the vibration signal outputted from the sensor 24 (S3).

Next, the abnormality detection calculation unit 15 determines whether or not a vibration amplitude (sensor data) the obtained vibration signal is indicating, i.e., a vibration amplitude generated by the reduction gear 22 is equal to or greater than a predetermined threshold value (S5).

The abnormality detection calculation unit 15 determines that, if the vibration amplitude is smaller than the threshold value (S5: NO), the reduction gear 22 is abnormal (the equipment is abnormal). Then, to notify a worker of this, the calculation result notification unit 16 controls the alarm notification unit 17 to issue an alarm (S7).

On the other hand, if the vibration amplitude is equal to or greater than the threshold value (S5: YES), it is determined that the reduction gear 22 is normal, i.e., the equipment is normal.

After executing the step S7, or if the reduction gear 22 is normal (S5: YES), it advances to step S9.

The calculation result notification unit 16, in the step S9, displays on the display unit 18 a calculation result including the determination result (abnormality detection result) of the step S5 (S9). For example, if an abnormality is determined in the step S5, a term of "Abnormal" is displayed, and if a normality is determined, a term of "Normal" is displayed. Also, it is possible to display a part (an abnormality detection object) for which the sensor 24 is arranged.

If it is determined in the step S1 that the electromagnetic brake 23 is inoperative (S1: NO), or after the execution of the step S9, it is determined whether or not the worker conducts, on the abnormality detection apparatus 1, an abnormality detection end operation, e.g., a push button operation (S11). If no operation is conducted, it returns to the step S1, and if the operation is conducted, the process exits.

According to the first embodiment, an abnormality of the work robot 2 is detected by comparing a vibration amplitude with a threshold value. However, it is also possible to detect an abnormality according to a determination method similar to a hammering test for analyzing a characteristic vibration frequency, a method for conducting a mode analysis based on, for example, the magnitude and phase of a transfer function, or the like.

Also, according to the first embodiment, a vibration signal during operation of the electromagnetic brake 23 is used to detect an abnormality of the work robot 2. A vibration also occurs when the operation of the electromagnetic brake 23 is released. Accordingly, the abnormality detection calculation unit 15 may obtain, through the sensor control unit 12, a vibration signal at the releasement, and with the use of the vibration signal, may detect an abnormality of the work robot 2. Also, it is possible to detect an abnormality with both the vibration signal during operation of the electromagnetic brake 23 and the vibration signal at the releasement.

Further, it is preferable that the controller operates the brake device (23) so that sensor data such as an amplitude in the above example becomes equal to or greater than a predetermined magnitude. With this, it is possible to relatively reduce errors contained in the sensor data and highly precisely detect an abnormality of the equipment.

In this way, according to the first embodiment, the abnormality detection apparatus 1 is provided with the controller that detects an abnormality of the equipment (2) according to sensor data that is related to a vibration of the equipment and is obtained from the vibration sensor (24) provided for the equipment. The equipment is provided with the movable part (the movable part of the work robot 2, the motor 21 and reduction gear 22) that is movable and the brake device (23) that brakes motion of the movable part.

Also, the controller detects an abnormality of the equipment according to sensor data obtained during operation of the brake device. Namely, the brake device applies a vibration to the apparatus and the vibration is reflected on the sensor data, so that an abnormality of the equipment for which the brake device is arranged is detectable. Further, there is provided an effect that there is no need of separately installing a device for applying a vibration to the equipment.

According to the first embodiment, the abnormality detection is executed even during work of the work robot 2, so that an abnormality of the work robot 2 is detectable without interrupting the work.

Further, the controller may operate the brake device in such a way that sensor data becomes equal to or greater than a predetermined magnitude, thereby enlarging the sensor data, relatively reducing errors, and highly precisely detecting an abnormality of the equipment.

Also, the equipment (2) is provided with the motor 21 for generating a drive force to move the movable part, as well as the reduction gear 22 for reducing a rotation speed of the motor 21. The vibration sensor (24) is arranged for the reduction gear 22, and according to sensor data, the controller detects an abnormality of the reduction gear 22. Accordingly, a vibration of the reduction gear 22 is reflected on the sensor data to enable the abnormality detection of the reduction gear 22.

The vibration sensor (24) may be arranged for the motor 21 so that an abnormality of the motor 21 is detected according to sensor data. With this, a vibration of the motor is reflected on the sensor data to enable the abnormality detection of the motor.

Namely, an abnormality of any one or both of the motor 21 and reduction gear 22 serving as a rotation mechanism is highly precisely detectable.

Second Embodiment

Figure 3:
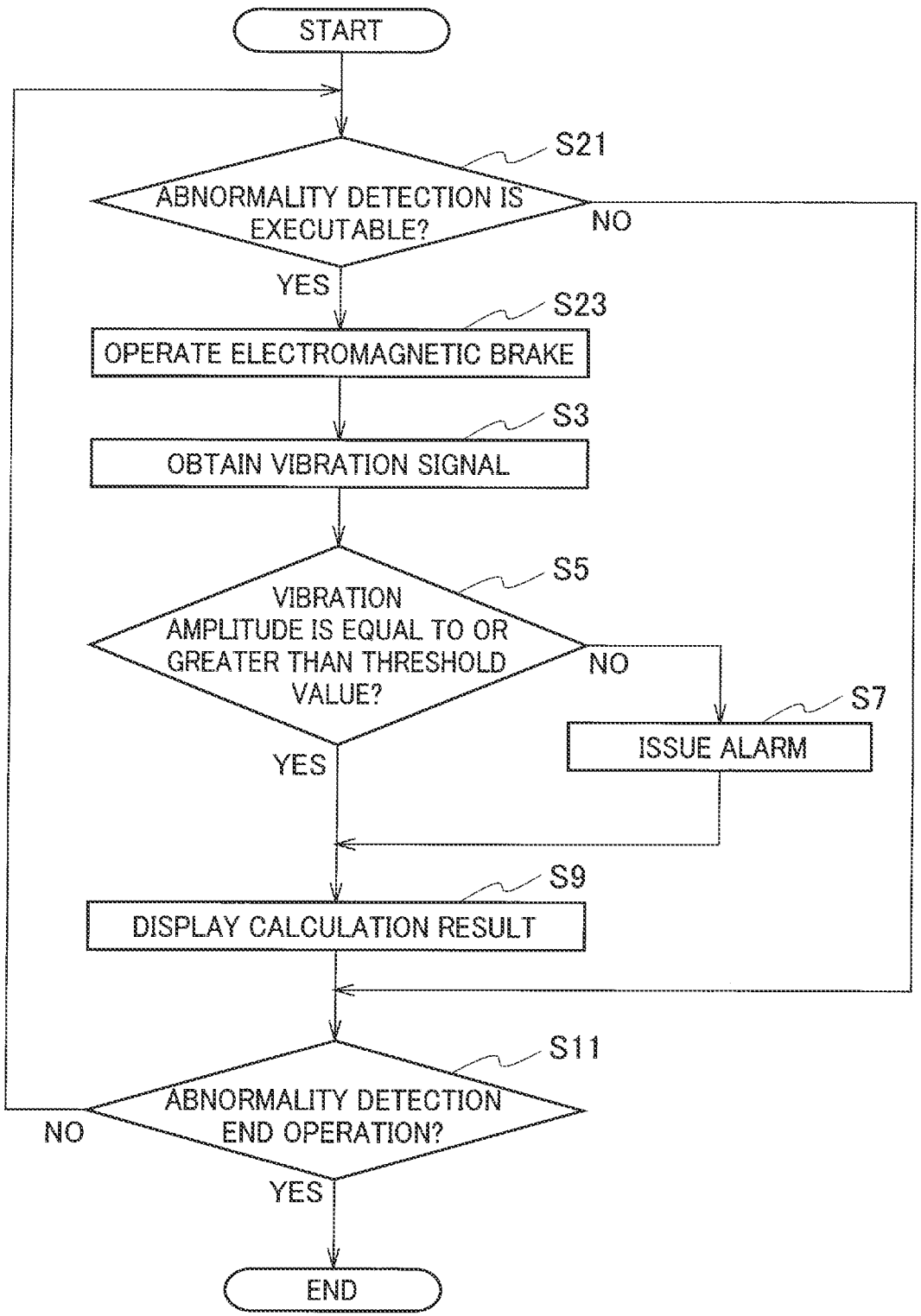
FIG. 3 is a flowchart illustrating an operation of the abnormality detection apparatus 1 according to a second embodiment.

An operation of the abnormality detection apparatus 1 according to the second embodiment will be explained with reference to a flowchart of FIG. 3. The abnormality detection apparatus 1 executes an abnormality detection method as illustrated in FIG. 3.

According to the second embodiment, the abnormality detection control unit 14 instructs the brake control unit 13 to operate the electromagnetic brake 23, thereby detecting an abnormality of the work robot 2.

First, the abnormality detection control unit 14 determines whether or not an abnormality detection is executable (S21). For example, it is determined whether or not executing an abnormality detection affects work of the work robot 2 (S21). The abnormality detection control unit 14 determines that, when the work robot 2 is in an idle time, an abnormality detection is executable because work of the work robot 2 is unaffected (S21: YES). More precisely, the abnormality detection control unit 14 obtains from the motor control unit 11 an operation state of the motor 21, and if the motor 21 is inoperative, determines that an abnormality detection is executable (S21: YES).

On the other hand, if the work of the work robot 2 is affected (S21: NO), it is determined whether or not a worker conducts, with respect to the abnormality detection apparatus 1, an abnormality detection end operation, e.g., a push button operation (S11). If the operation is not conducted, it returns to the step S21, and if the operation is conducted, the process exits.

If it is determined to be YES in the step S21, although not illustrated, an abnormality detection standby state is continued until an abnormality detection start operation is taken place.

For example, if the worker wants an abnormality detection and conducts an abnormality detection start operation such as a push button operation, the abnormality detection control unit 14 instructs the brake control unit 13 to operate the electromagnetic brake 23 to carry out an abnormality detection.

Following the instruction, the brake control unit 13 transmits a brake control signal to the electromagnetic brake 23, thereby operating the electromagnetic brake 23 (S23).

Carried out thereafter are step S3 and steps that follow which are the same as those of the first embodiment, and therefore, explanations thereof are omitted.

In this way, according to the second embodiment, the brake device is operated when the rotation mechanism part (movable part) is not working such as when the work robot 2 is in an idle time, thereby excluding a vibration by the operation of the rotation mechanism part (movable part) so that an abnormality of the equipment is detectable more surely and accurately than detecting the same during a working time.

Also, when an abnormality detection start operation is taken place, i.e., when an abnormality detection is clearly instructed, the detection of an abnormality of the equipment is carried out, and therefore, it is possible to instruct an abnormality detection at required timing and detect an abnormality of the equipment.

Third Embodiment

Figure 4:
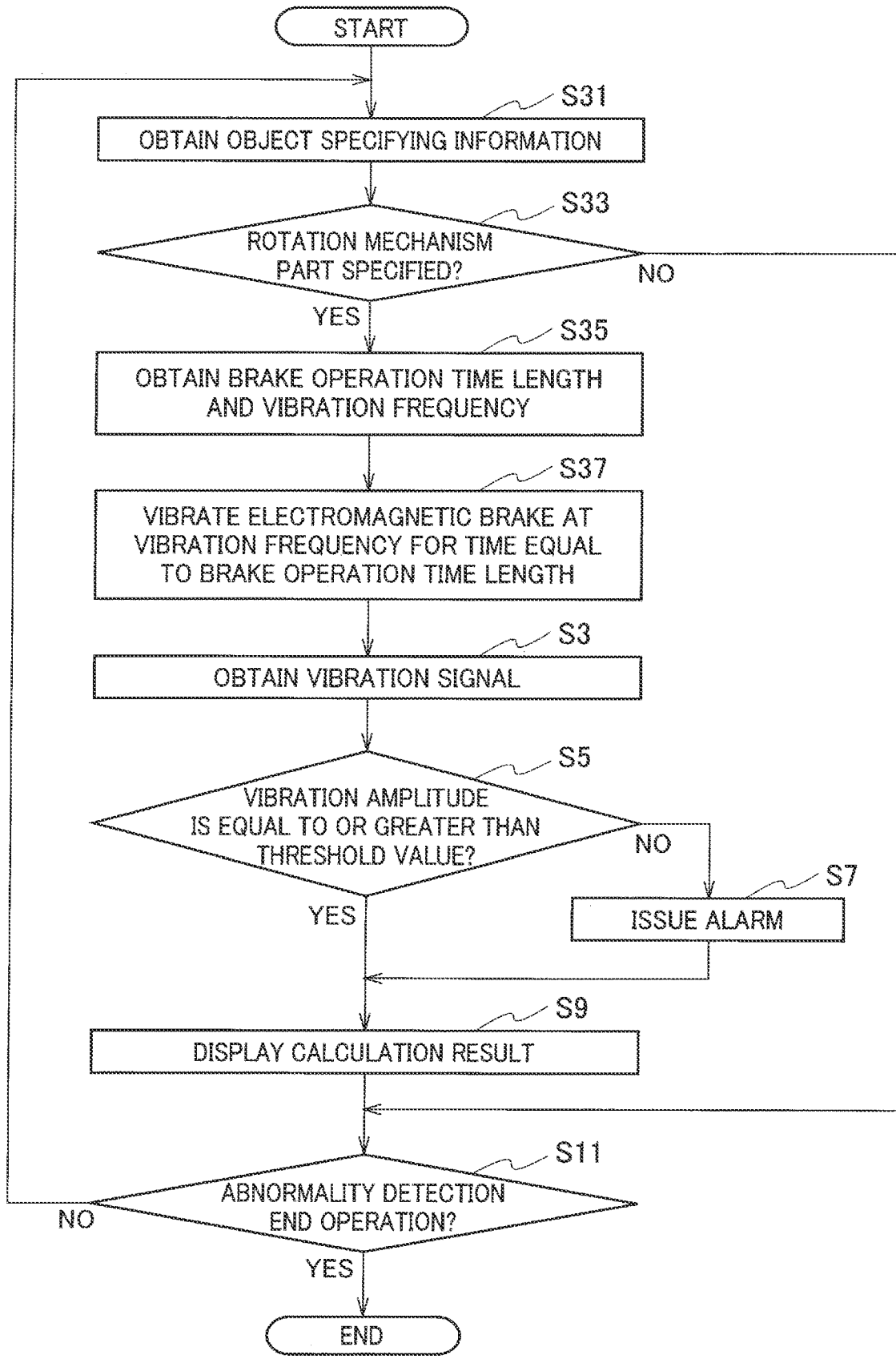
FIG. 4 is a flowchart illustrating an operation of the abnormality detection apparatus 1 according to a third embodiment.

An operation of the abnormality detection apparatus 1 according to the third embodiment will be explained with reference to a flowchart of FIG. 4. The abnormality detection apparatus 1 executes an abnormality detection method as illustrated in FIG. 4.

According to the third embodiment, one work robot is provided with a plurality of rotation mechanism parts (movable parts) and each of the movable parts includes the motor 21 and reduction gear 22 and is provided with the electromagnetic brake 23 and sensor 24. Then, the abnormality detection apparatus 1 specifies an abnormality detection objective rotation mechanism part, a time length of operation of the electromagnetic brake 23 (hereunder called a brake operation time length), and a vibration frequency and detects an abnormality.

First, similar to the second embodiment, it is confirmed that work of the work robot 2 is not affected, and then, the abnormality detection control unit 14 obtains object specifying information to specify an objective rotation mechanism part (S31). The object specifying information is included in, for example, an abnormality detection program and is obtained from the abnormality detection program. For example, the abnormality detection control unit 14 obtains, from the object specifying information, a name "J3 axis" indicating an objective rotation mechanism part.

Next, the abnormality detection control unit 14 determines whether or not the objective rotation mechanism part is specified in the object specifying information (S33).

If the objective rotation mechanism part is not specified (S33: NO), it is determined whether or not a worker conducts, with respect to the abnormality detection apparatus 1, an abnormality detection end operation (for example, a push button operation) (S11). If the operation is not conducted, it returns to the step S31, and if the operation is conducted, the process ends. Namely, a standby state is maintained until the abnormality detection object is specified.

On the other hand, if the objective rotation mechanism part is specified (S33: YES), the abnormality detection control unit 14 obtains a brake operation time length and a vibration frequency that are specified together with the objective rotation mechanism part in, e.g., the abnormality detection program (S35). For example, the abnormality detection control unit 14 obtains a brake operation time length of "three seconds" and a vibration frequency of "40 Hz" set for the J3 axis.

The abnormality detection control unit 14 issues, with respect to the brake control unit 13, a brake start instruction by specifying the objective rotation mechanism part, brake operation time length, and vibration frequency. Here, it is possible to beforehand set, in the abnormality detection program, abnormality detection timing such as a date and time together with the rotation mechanism part, brake operation time length, and vibration frequency, so that the abnormality detection timing is obtained from the abnormality detection program and so that the brake start instruction is issued at the timing.

According to the instruction, the brake control unit 13 transmits, to the electromagnetic brake 23 arranged for the objective rotation mechanism part, a brake control signal at an operation frequency that is the same as the vibration frequency for a time that is the same as the brake operation time length, thereby vibrating the electromagnetic brake 23 (S37).

With this, the electromagnetic brake 23 generates a vibration at the vibration frequency that is the same as the operation frequency for the time that is the same as the brake operation time length and applies the vibration to the motor 21. Then, the electromagnetic brake 23 ends the operation (vibration application) when the time that is the same as the brake operation time length elapses.

Carried out thereafter are step 3 and steps that follow which are the same as those of the first embodiment, and therefore, explanations thereof are omitted.

Although the third embodiment specifies a time length (brake operation time length) for applying a vibration, this brake operation time length includes a time length from a vibration start until a vibration frequency becomes stabilized, and therefore, it is possible to specify a time length from which such a time length (a vibration frequency stable time length) is excluded. Further, since the vibration does not disappear instantaneously when the electromagnetic brake 23 is released, it is possible to include a time length from the brake releasement until the vibration disappears in the brake operation time length to be specified. Namely, it is possible to specify, as the brake operation time length, the time length during which a vibration frequency is stable, or it is possible to include, in the brake operation time length, a transient time length before and after the stable frequency time.

Also, although the third embodiment arranges the sensor 24 for each of the rotation mechanism parts, it is possible to arrange one sensor 24 for a plurality of the rotation mechanism parts. Also, a plurality of the sensors 24 may detect vibrations of rotation mechanism parts whose number is greater than the number of the sensors 24. Namely, the sensor 24 can be used for vibration detection of a rotation mechanism part that is different from the rotation mechanism part for which the sensor 24 is arranged.

As mentioned above, the third embodiment operates the brake device (23) at a predetermined frequency for a predetermined time to apply a vibration to the equipment at a specified frequency for a specified time, thereby precisely detecting an abnormality of the equipment.

For example, by operating (vibrating) the brake device (23) at a characteristic vibration frequency, it is possible to clearly reflect an abnormality on the vibration and precisely detect an abnormality of the equipment. Also, by operating (vibrating) the brake device at a characteristic vibration frequency intrinsic to an equipment part such as the reduction gear 22 for which the brake device is arranged, it is possible to detect an abnormality of the specific part such as the reduction gear 22 of the equipment. Also, by operating (vibrating) the brake device at a characteristic vibration frequency intrinsic to a machine part whose abnormality is particularly required to be detected among parts such as the reduction gear 22 of the equipment for which the brake device is arranged, it is possible to detect an abnormality of the specific machine part.

Fourth Embodiment

An operation of the abnormality detection apparatus 1 according to the fourth embodiment will be explained with reference to a flowchart of FIG. 5. The abnormality detection apparatus 1 executes an abnormality detection method as illustrated in FIG. 5.

According to the fourth embodiment, an abnormality is detected with the use of, other than a vibration amplitude, a product sum of vibration power spectrum obtained from a vibration signal and a phase difference between a phase of the vibration signal and a phase of a vibration signal at the time when the equipment is normal.

Figure 5:
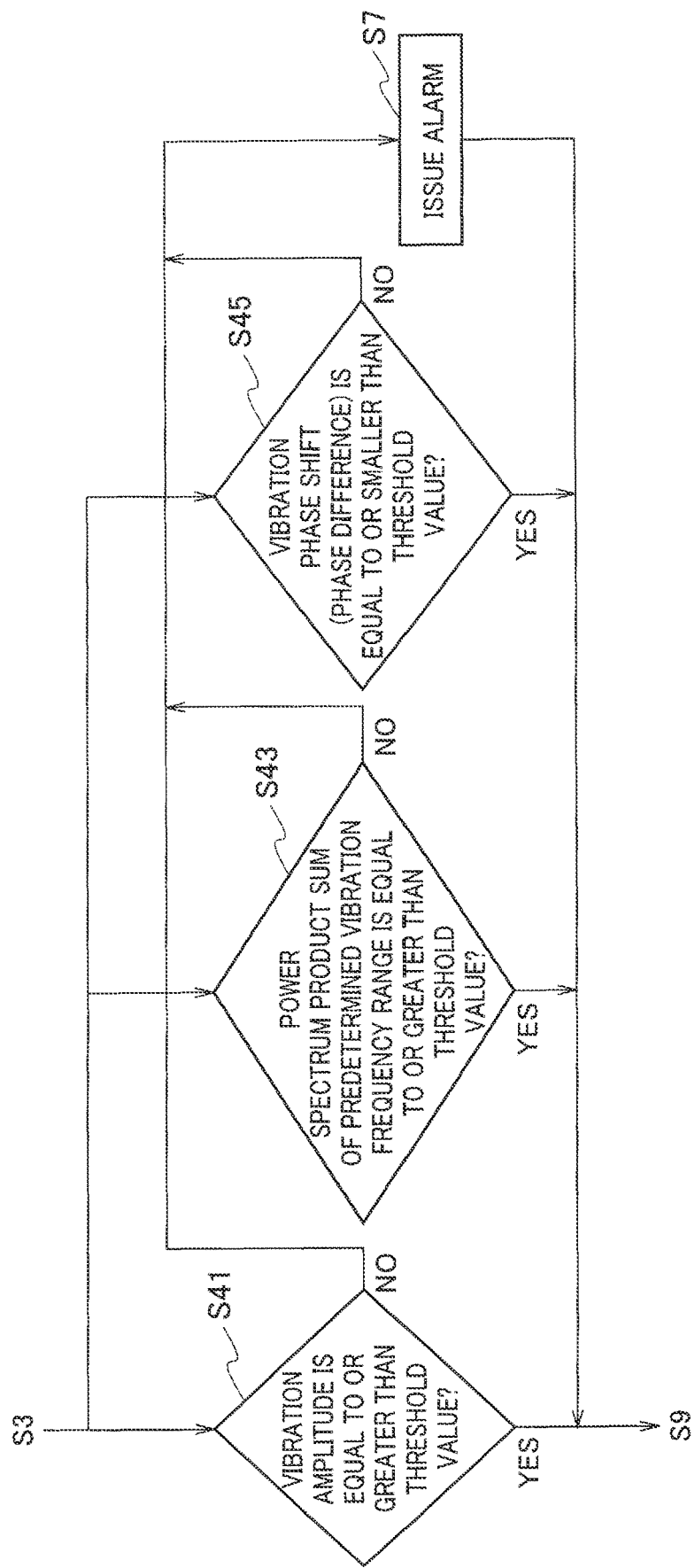
FIG. 5 is a flowchart illustrating an operation of the abnormality detection apparatus 1 according to a fourth embodiment.

According to the fourth embodiment, instead of the steps S5 and S7 of the first to third embodiments, a process illustrated in the flowchart of FIG. 5 is carried out.

First, the abnormality detection calculation unit 15 determines whether or not a vibration amplitude of a vibration signal obtained in step S3, i.e., an amplitude of a vibration generated by the reduction gear 22 or motor 21 (hereunder, simply referred to as the vibration) is equal to or greater than a predetermined threshold value (S41).

Also, the abnormality detection calculation unit 15 finds, according to the vibration signal obtained in the step S3, a product sum of power spectrum of a predetermined frequency range of the vibration and determines whether or not the product sum is equal to or greater than a predetermined threshold value (S43). The power spectrum product sum is obtainable by, for example, carrying out a Fast Fourier Transform of the vibration signal and by accumulating (integrating) power spectrum density in a frequency range of, for example, 100 kHz to 1000 kHz.

Also, the abnormality detection calculation unit 15 determines whether or not a phase difference (phase shift) between a phase of the vibration signal obtained in the step S3 and a phase of a vibration signal at the time when the equipment (2) is normal is equal to or smaller than a predetermined threshold value (S45). For example, a phase of normal time, i.e., a phase when the work robot 2 is first installed in a production site is stored and a difference (phase difference) between a phase at the time of abnormality detection and that phase is calculated as the above-mentioned phase shift. Namely, a waveform shape of the vibration signal at the normal time is compared with a waveform shape of the vibration signal at the time of abnormality detection, to find the phase shift.

If the vibration amplitude is smaller than the threshold value (S41: NO), or if the power spectrum product sum is smaller than the threshold value (S43: NO), or if the phase shift (phase difference) is greater than the threshold value (S45: NO), the abnormality detection calculation unit 15 determines that the work robot 2 is abnormal, i.e., the rotation mechanism part is abnormal. Then, to notify a worker of this, it controls the alarm notification unit 17 to issue an alarm (S7).

After executing the step S7, or if the vibration amplitude is equal to or greater than the threshold value (S41: YES), or if the power spectrum product sum is equal to or greater than the threshold value (S43: YES), or if the phase shift (phase difference) is equal to or smaller than the threshold value (S45: YES), it advances to step S9.

The step S9 and steps that follow are the same as those of the first embodiment, and therefore, explanations thereof are omitted.

Similar to the vibration amplitude, the fourth embodiment considers that, if the product sum of vibration power spectrum is smaller than the threshold value, a gap between machine parts of the rotation mechanism part is widened due to abrasion or bite to reduce a frictional force and absorb the power spectrum. On the other hand, it is considered that, if the power spectrum product sum is equal to or greater than the threshold value, the gap between machine parts is narrow not to absorb the vibration but to increase the power spectrum product value. Accordingly, an abnormality is determined if the power spectrum product value is smaller than the threshold value.

On the other hand, contrary to the vibration amplitude, the phase shift increases due to abrasion or bite of machine parts in the rotation mechanism part. Accordingly, if the phase shift is greater than the threshold value, an abnormality is determined.

Instead of determining that the work robot 2 is abnormal if one, or two, or three of the steps S41, S43, S45 determines NO as mentioned above, it is possible to determine that the work robot 2 is abnormal if two or more of the steps determine NO. Alternatively, it is possible to detect an abnormality without using one or two of the amplitude, product sum, and phase difference.

As mentioned above, the fourth embodiment employs, as sensor data, at least one of an amplitude of a vibration signal outputted from the vibration sensor (24), a vibration power spectrum product sum of the vibration signal, and a phase difference between a phase of the vibration signal and a phase of a vibration signal at the time when the equipment is normal, to detect an abnormality of the equipment. Namely, the embodiment employs at least one of a plurality of characteristics of the vibration signal, to highly accurately detect an abnormality of the equipment. For example, by combining two or more of the amplitude, product sum, and phase difference, an abnormality of the equipment is highly precisely detectable.

Fifth Embodiment

An operation of the abnormality detection apparatus 1 according to the fifth embodiment will be explained with reference to a flowchart of FIG. 6. The abnormality detection apparatus 1 executes an abnormality detection method as illustrated in FIG. 6.

According to the fifth embodiment, one work robot 2 is provided with a plurality of rotation mechanism parts (movable parts) and each of the movable parts includes the motor 21 and reduction gear 22 and is provided with the electromagnetic brake 23 and sensor 24.

The controller detects, in one time of abnormality detection operation, abnormalities of a plurality of, for example, all of the rotation mechanism parts. At this time, the controller individually (for example, sequentially) operates the brake devices (23), and according to sensor data obtained from the vibration sensor (24) corresponding to the brake device in operation, detects an abnormality of the movable part for which the brake device in operation is provided.

Figure 6:
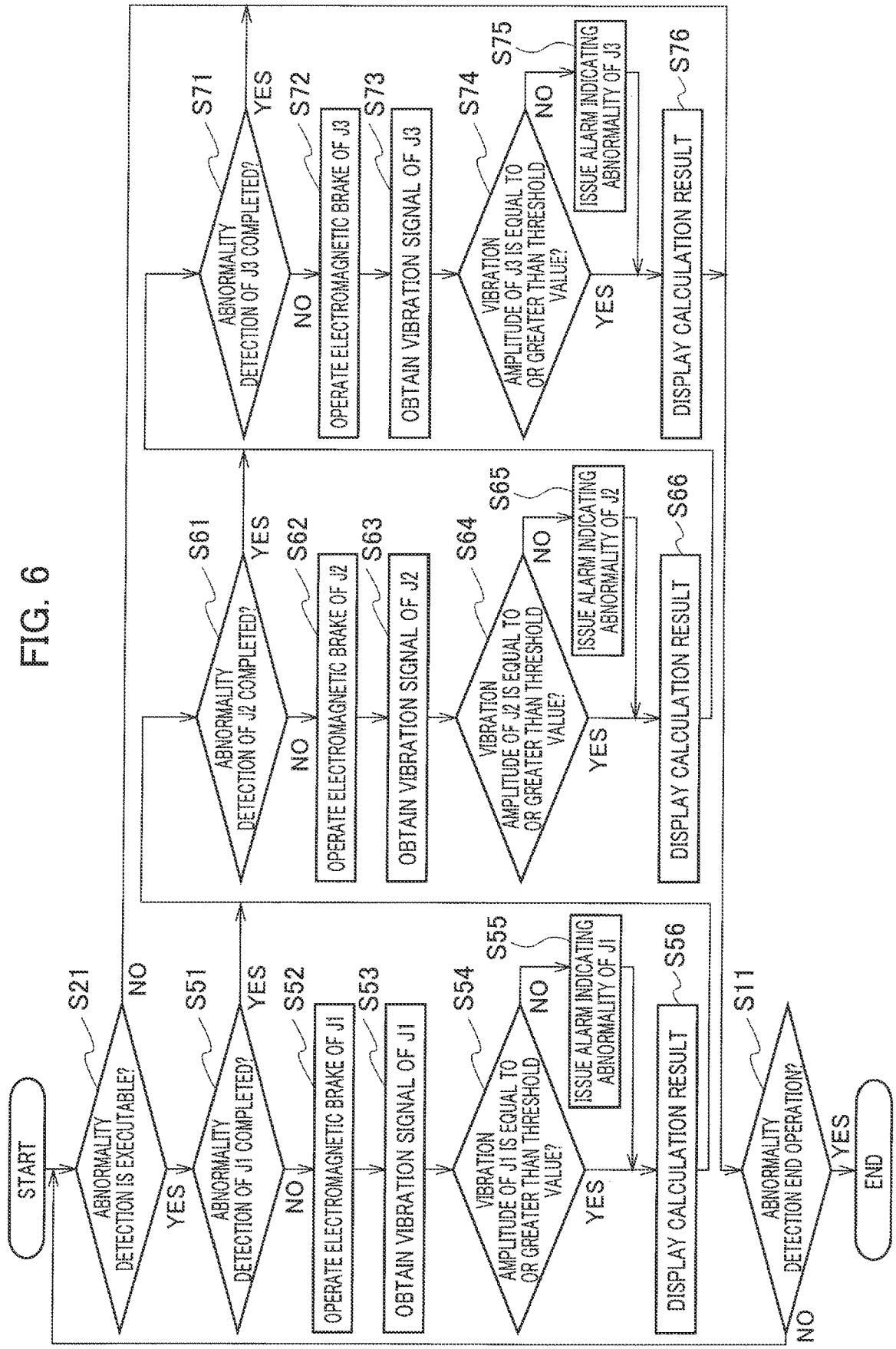
FIG. 6 is a flowchart illustrating an operation of the abnormality detection apparatus 1 according to a fifth embodiment.

The flowchart of FIG. 6 is for a case in which one work robot 2 is provided with rotation mechanism parts J1, J2, and J3 and all of the rotation mechanism parts are set to be detection objects.

First, similar to the second embodiment, the abnormality detection control unit 14 determines whether or not an abnormality detection is executable (S21).

If the abnormality detection is executable (S21: YES), the abnormality detection control unit 14 determines whether or not an abnormality detection of the rotation mechanism part J1 is completed (S51).

If the abnormality detection of the rotation mechanism part J1 is not completed (S51: NO), the abnormality detection control unit 14 issues a brake start instruction to the brake control unit 13 by specifying the rotation mechanism part J1, a brake operation time length, and a vibration frequency.

By the instruction, the brake control unit 13 transmits, to the electromagnetic brake 23 provided for the rotation mechanism part J1, a brake control signal at an operation frequency that is the same as the vibration frequency for a time length that is the same as the brake operation time length, thereby operating the electromagnetic brake 23 (S52).

For example, there are specified, in the abnormality detection program, the rotation mechanism part J1, a characteristic vibration frequency (vibration frequency) intrinsic to the reduction gear 22 of the rotation mechanism part J1, and a time length (brake operation time length) for which the electromagnetic brake 23 of the rotation mechanism part J1 is operated, and according to the specifications, the abnormality detection control unit 14 issues the brake start instruction.

Also, the abnormality detection control unit 14 operates the sensor 24 of the rotation mechanism part J1 through the sensor control unit 12. Then, the abnormality detection calculation unit 15 obtains a vibration signal outputted from the sensor 24 (S53) and advances to step S54.

Steps S54, S55, and S56 are the same as the steps S5, S7, and S9 of the first embodiment, and therefore, explanations thereof are omitted. By the way, the step S55 issues an alarm indicating that the rotation mechanism part J1 is abnormal.

After executing the step S56, or if the abnormality detection of the rotation mechanism part J1 is completed (S51: YES), the abnormality detection control unit 14 determines whether or not an abnormality detection of the rotation mechanism part J2 is completed (S61).

If the abnormality detection of the rotary mechanism part J2 is not completed (S61: NO), the abnormality detection control unit 14 issues a brake start instruction to the brake control unit 13 by specifying the rotation mechanism part J2, a brake operation time length, and a vibration frequency.

By the instruction, a brake control signal at an operation frequency that is the same as the vibration frequency for a time length that is the same as the brake operation time length is transmitted from the brake control unit 13 to the electromagnetic brake 23 provided for the rotation mechanism part J2, thereby the electromagnetic brake 23 is operated (S62).

For example, similar to the rotation mechanism part J1, there are specified, in the abnormality detection program, the objective rotation mechanism part, vibration frequency, and brake operation time length, and according to the specifications, the abnormality detection control unit 14 issues the brake start instruction.

Also, the abnormality detection control unit 14 operates the sensor 24 of the rotation mechanism part J2 through the sensor control unit 12. Then, the abnormality detection calculation unit 15 obtains a vibration signal outputted from the sensor 24 (S63) and advances to step S64.

Steps S64, S65, and S66 are the same as the steps S5, S7, and S9 of the first embodiment, and therefore, explanations thereof are omitted. By the way, the step S65 issues an alarm indicating that the rotation mechanism part J2 is abnormal.

After executing the step S66, or if the abnormality detection of the rotation mechanism part J2 is completed (S61: YES), the abnormality detection control unit 14 determines whether or not an abnormality detection of the rotation mechanism part J3 is completed (S71).

If the abnormality detection of the rotary mechanism part J3 is not completed (S71: NO), the abnormality detection control unit 14 issues a brake start instruction to the brake control unit 13 by specifying the rotation mechanism part J3, a brake operation time length, and a vibration frequency.

By the instruction, a brake control signal at an operation frequency that is the same as the vibration frequency for a time length that is the same as the brake operation time length is transmitted to the electromagnetic brake 23 provided for the rotation mechanism part J3 from the brake control unit 13, thereby operating the electromagnetic brake 23 (S72).

For example, similar to the rotation mechanism part J1, there are specified, in the abnormality detection program, the objective rotation mechanism part, vibration frequency, and brake operation time length, and according to the specifications, the abnormality detection control unit 14 issues the brake start instruction.

Also, the abnormality detection control unit 14 operates, through the sensor control unit 12, the sensor 24 of the rotation mechanism part J3. Then, the abnormality detection calculation unit 15 obtains a vibration signal outputted from the sensor 24 (S73) and advances to step S74.

Steps S74, S75, and S76 are the same as the steps S5, S7, and S9 of the first embodiment, and therefore, explanations thereof are omitted. By the way, the step S75 issues an alarm indicating that the rotation mechanism part J3 is abnormal.

After executing the step S76, or if the abnormality detection of the rotation mechanism part J3 is completed (S71: YES), or if it is determined that no abnormality detection must be carried out (S21: NO), it is determined whether or not a worker carries out, with respect to the abnormality detection apparatus 1, an abnormality detection end operation, e.g., a push button operation (S1). If the operation is not carried out, it returns to step S21, and if the operation is carried out, the process ends.

Figure 7:
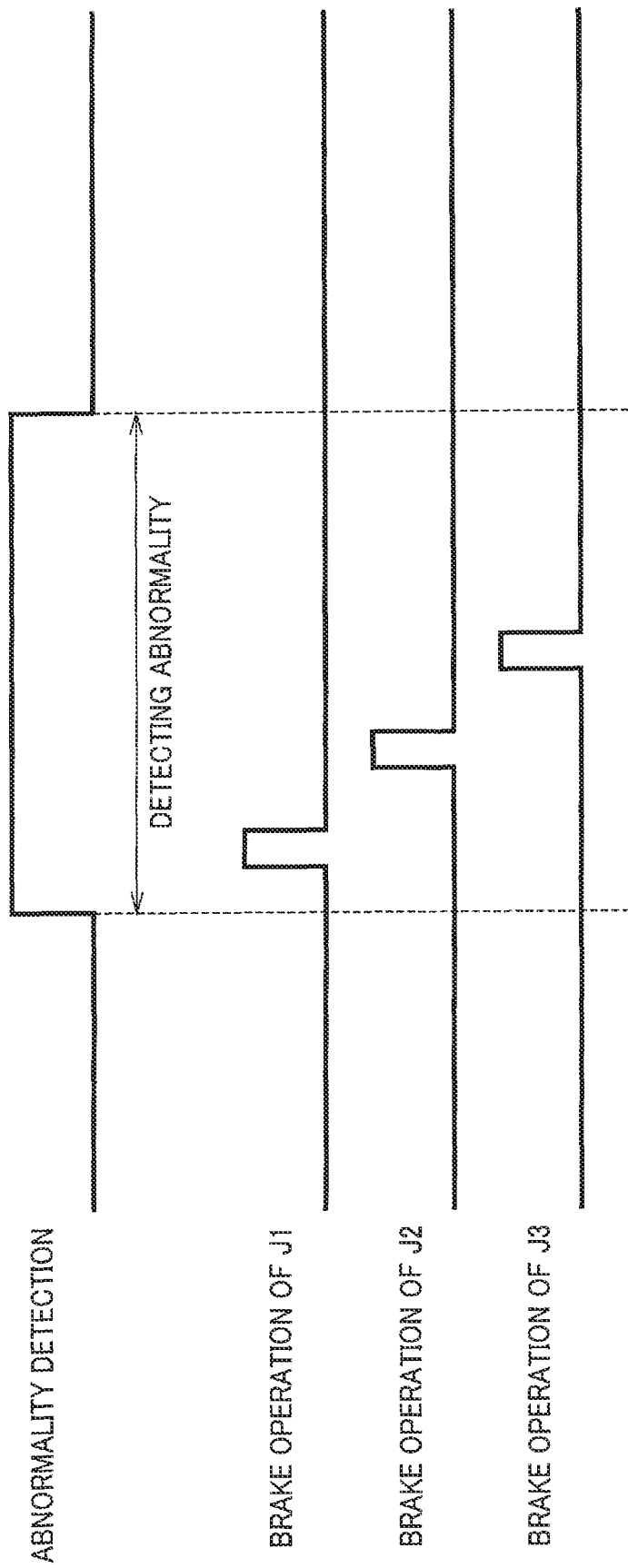
FIG. 7 is a timing chart of brake operations according to the fifth embodiment.

As illustrated in FIG. 7, during the abnormality detection, if the electromagnetic brake 23 of the rotation mechanism part J1 is operative, the electromagnetic brakes 23 of the rotation mechanism parts J2 and J3 are inoperative.

After the abnormality detection of the rotation mechanism part J1 is completed, the electromagnetic brake 23 of the rotation mechanism part J2 is operative. At this time, the electromagnetic brakes 23 of the rotation mechanism parts J1 and J3 are inoperative.

After the abnormality detection of the rotation mechanism part J2 is completed, the electromagnetic brake 23 of the rotation mechanism part J3 is operative. At this time, the electromagnetic brakes 23 of the rotation mechanism parts J1 and J2 are inoperative. Namely, the electromagnetic brakes 23 of the rotation mechanism parts J1, J2, and J3 do not operate overlappingly. Accordingly, without being influenced by the electromagnetic brakes 23 of the other rotation mechanism parts, it is possible to improve an accuracy of the abnormality detection of an objective rotation mechanism part.

As explained above, according to the fifth embodiment, the controller individually operates the brake devices (23), and according to sensor data obtained from the vibration sensor (24) corresponding to the brake device in operation, detects an abnormality of the movable part for which the brake device (23) in operation is arranged. Namely, a vibration is applied individually to each movable part to enable an individual abnormality detection of each movable part.

Although the fifth embodiment detects an abnormality according to a vibration amplitude, it is possible to detect an abnormality, like the fourth embodiment, according to a vibration power spectrum product sum or a vibration signal phase difference. The same is applicable to the first to third embodiments.

Sixth Embodiment

Figure 8:
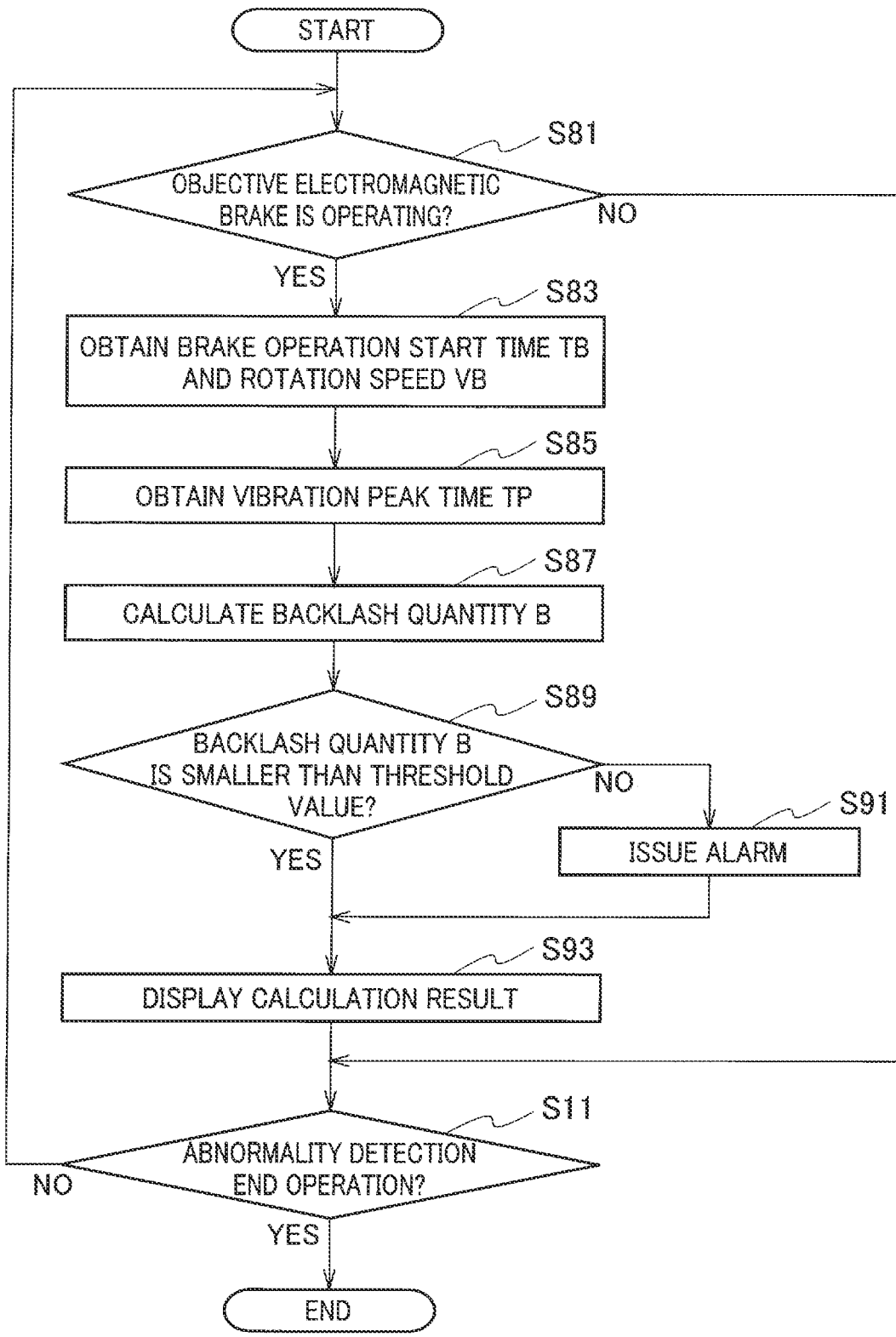
FIG. 8 is a flowchart illustrating an operation of the abnormality detection apparatus 1 according to a sixth embodiment.

An operation of the abnormality detection apparatus according to the sixth embodiment will be explained with reference to a flowchart of FIG. 8. The abnormality detection apparatus 1 executes an abnormality detection method as illustrated in FIG. 8.

According to the sixth embodiment, the controller carries out a backlash analysis of gears forming the reduction gear 22. Similar to the first embodiment, it is assumed that the equipment (2) is provided with the motor 21 for generating power for moving the movable part, the reduction gear 22 for reducing a rotation speed of the motor, and the brake device (23) for braking the motor. Also, similar to the first embodiment, it is assumed that the vibration sensor (24) is provided for the reduction gear 22. Also, it is assumed that a rotation mechanism part (an objective rotation mechanism part) that contains a backlash analysis objective reduction gear is specified.

First, the abnormality detection calculation unit 15 obtains, from the brake control unit 13, information about a state of the electromagnetic brake 23 of the objective rotation mechanism part, and according to the information, determines whether or not the backlash analysis objective electromagnetic brake 23 of the rotation mechanism part is operative (S81).

The abnormality detection calculation unit 15 obtains, from the brake control unit 13, an operation start time (hereunder called a brake operation start time Tb) of the electromagnetic brake 23 of the objective rotation mechanism part and a rotation speed (hereunder called a rotation speed Vb) of the objective electromagnetic brake 23 (S83).

The abnormality detection calculation unit 15 obtains, from the sensor control unit 12, a time (hereunder called a vibration peak time Tp) at which an amplitude of a vibration signal outputted by the sensor 24 of the objective rotation mechanism part first reaches a peak (S85). The abnormality detection calculation unit 15 may detect the vibration peak time Tp from the vibration signal.

The abnormality detection calculation unit 15 calculates, according to a time difference between the brake operation start time Tb and the vibration peak time Tp, a backlash quantity B indicating the magnitude of a backlash of gears forming the reduction gear contained in the objective rotation mechanism part. For example, the backlash quantity B is calculated according to the following expression (S87):

$$B=Vb/(Tp-Tb).$$

The backlash quantity B may be calculated by multiplying a predetermined coefficient to provide, for example, a backlash angle (unit is, for example, "degree") or a gap length (unit is, for example, "mm") caused by the backlash.

The abnormality detection calculation unit 15 determines whether or not the backlash quantity B is smaller than a predetermined threshold value (S89).

If the backlash quantity B is equal to or greater than the threshold value (S89: NO), the abnormality detection calculation unit 15 notifies this to a worker through the calculation result notification unit 16 that controls the alarm notification unit 17 to issue an alarm (S91).

After executing the step S91, or if the reduction gear is normal (S89: YES), it advances to step S93.

The calculation result notification unit 16 in the step S93 makes the display unit 18 display a calculation result including the determination result of the step S89 (the determination result whether or not the backlash quantity B is equal to or greater than the threshold value) (S93). It is possible to display the backlash quantity B.

If it is determined in the step S81 that the electromagnetic brake 23 is not operating (S81: NO), or after executing the step S93, it is determined whether or not the worker conducts, with respect to the abnormality detection apparatus 1, an abnormality detection end operation (S11). If the operation is not conducted, it returns to the step S81, and if conducted, the process exits.

As explained above, according to the sixth embodiment, the controller calculates, according to a time difference between an operation start time of the brake device and a time at which sensor data indicates a peak, a backlash quantity of the reduction gear, and therefore, the backlash quantity is calculable without operating the brake device only for the abnormality detection. Also, since it is possible to analyze a backlash state, an abnormality of the equipment is highly precisely detectable.

Figure 9:
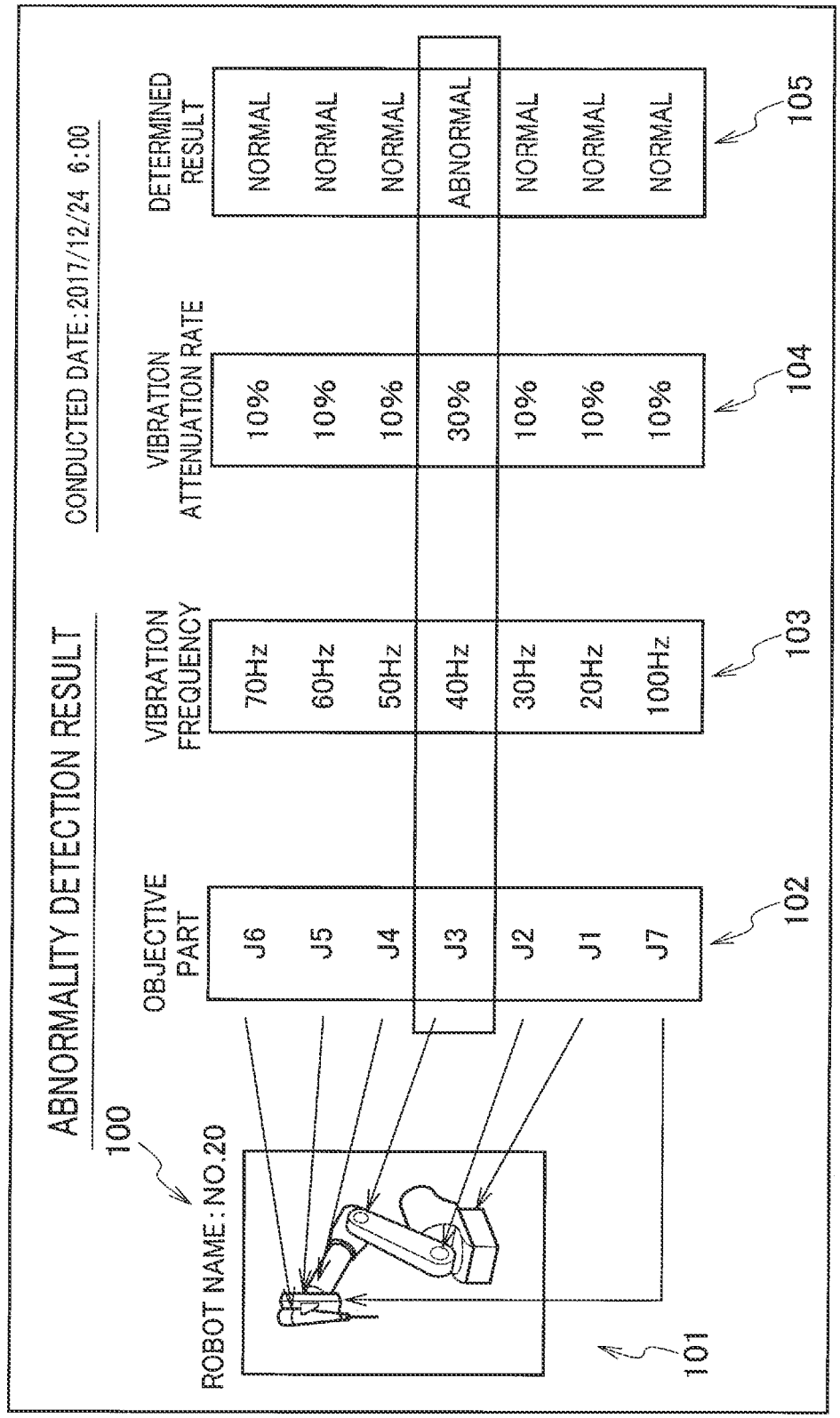
FIG. 9 is a view illustrating an example of calculation results to be displayed on a display unit 18.

FIG. 9 is a view illustrating examples of calculation results displayed on the display unit 18.

On a screen of the display unit 18, there are displayed, for example, a name 100 of the work robot 2, an image 101 showing the positions of rotation mechanism parts that are abnormality detection objects, and an image 102 showing names of the rotation mechanism parts (movable parts) that are the abnormality detection objects.

Also displayed on the screen are an image 103 showing vibration frequencies of the electromagnetic brakes 23 at which the rotation mechanism parts are detected for their abnormalities and an image 104 showing decrease rates (vibration attenuation rates) of vibration amplitudes of the rotation mechanism parts due to frictional force decreases of machine parts. Also displayed on the screen is an image 105 showing determination results whether or not the rotation mechanism parts are abnormal.

The image 101 includes, to clarify at a glance relationships with the names of the rotation mechanism parts, arrow marks extending from the names of the rotation mechanism parts to the positions of the rotation mechanism parts.

The image 103 shows the vibration frequencies of vibrations applied by the electromagnetic brakes 23 to the objective rotation mechanism parts. The image 103 shows states of the brake devices that are in operation, and other than the vibration frequencies, may show, for example, operating time lengths.

The vibration attenuation rate is calculated, for example, as mentioned below. Namely, with A0 (normal value) as a vibration amplitude or a vibration power spectrum integrated value (hereunder called an observed value) at the time when the work robot 2 is initially installed in a production site and An (detected value) as an observed value at the time of an abnormality detection, the vibration attenuation rate D is calculated as $D=\{1-(An/A0)\}\times100$ [%].

If the vibration attenuation rate D increases, i.e., if a vibration decreases, it is considered that a gap in machine parts of the rotation mechanism part widens due to abrasion or bite, to decrease a frictional force and absorb the vibration, and therefore, this is determined to be abnormal.

On the other hand, if the vibration attenuation rate D is smaller, i.e., if the vibration is larger, it is determined that a gap in the machine parts of the rotation mechanism part is narrower, to increase a frictional force and not to absorb the vibration, and therefore, this is determined to be normal.

By the way, as mentioned above, the abnormality is also detectable according to a hammering-test-like determination method, for example, a method of conducting a mode analysis based on a transfer function magnitude and phase.

Abnormality detection results obtained from such methods are displayed according to the rotation mechanism parts.

The worker is able to understand the contents and results of the abnormality detections by seeing the displayed calculation results, thereby improving reliability of the abnormality detection apparatus 1. Also, it is possible to confirm that, by seeing the calculation results, an alarm issued when the equipment is abnormal is not an erroneous notification, thereby improving reliability of the alarm. Further, in case of abnormality, a quick maintenance is achievable.

In this way, the controller controls to display, on the screen, the movable part name (102), operating brake device state (103), vibration attenuation rate (104) indicating a rate of decrease of vibration of the movable part compared to a past time point, and determination result (105) indicating whether or not the movable part is abnormal. By the way, it is possible to control such that one or more of them is displayed on the screen. With this, the worker is able to see and understand the displayed contents, and as a result, reliability of an alarm to be issued when the equipment is abnormal improves.

Although the embodiments of the present invention have been described above, it must not be understood that the descriptions and drawings that form a part of this disclosure limit the present invention. From this disclosure, various alternative modes, embodiments, and application techniques will become apparent for persons skilled in the art.

By the way, objective equipment whose abnormality is to be detected is not limited to the work robot 2. For example, it is possible to use a vehicle engine instead of the motor, or a transmission instead of the reduction gear. Also, the object can be a movable part of a mobile body, a mobile body like play equipment in a playground, a machine tool like a 3-D printer, and the like, i.e., any equipment having a movable part.

Also, the abnormality detection by the abnormality detection apparatus 1 is applicable to a failure prediction or forecast. For example, if a time from an abnormality occurrence to a failure is known, the abnormality detection can be said a failure prediction or forecast.

DESCRIPTION OF REFERENCE NUMERALS

1: Abnormality detection apparatus
2: Work robot (Equipment)
11: Motor control unit
12: Sensor control unit
13: Brake control unit
14: Abnormality detection control unit
15: Abnormality detection calculation unit
16: Calculation result notification unit
17: Alarm notification unit
18: Display unit
21: Motor
22: Reduction gear
23: Electromagnetic brake (Brake device)
24: Sensor (Vibration sensor)
B: Backlash quantity
Tb: Brake operation start time
Tp: Vibration peak time
Vb: Rotation speed

The invention claimed is:

1. An abnormality detection apparatus comprising a controller that detects an abnormality of an equipment according to sensor data obtained from a vibration sensor provided for the equipment and related to a vibration of the equipment, characterized in that:
the equipment includes a movable part that is movable and a brake device that brakes a motion of the movable part; and
the controller detects an abnormality of the equipment except for the brake device according to the sensor data obtained while the brake device is operative.

2. The abnormality detection apparatus as set forth in claim 1, characterized in that the controller operates the brake device to brake the motion of the movable part in response to a reception of an abnormality detection instruction signal, and detects an abnormality of the equipment according to the sensor data obtained while the brake device is operative.

3. The abnormality detection apparatus as set forth in claim 1, characterized in that the controller operates the brake device such that the sensor data becomes equal to or greater than a predetermined magnitude.

4. The abnormality detection apparatus as set forth in claim 1, characterized in that the controller operates the brake device at a predetermined frequency for a predetermined time.

5. The abnormality detection apparatus as set forth in claim 1, characterized in that the controller operates the brake device when the movable part is not in operation.

6. The abnormality detection apparatus as set forth in claim 1, characterized in that:
the equipment includes a motor generating a drive force to move the movable part and a reduction gear reducing a rotation speed of the motor;
the vibration sensor is arranged for the motor or the reduction gear; and
the controller detects an abnormality of the motor or of the reduction gear according to the sensor data.

7. The abnormality detection apparatus as set forth in claim 1, characterized in that the controller detects an abnormality of the equipment according to the sensor data that is derived from at least one of an amplitude of a vibration signal outputted by the vibration sensor, a vibration power spectrum product sum obtained from the vibration signal, and a phase difference between a phase of the vibration signal and a phase of the vibration signal at the time when the equipment is normal.

8. The abnormality detection apparatus as set forth in claim 1, characterized in that:
the equipment includes a plurality of the movable parts;
each of the movable parts is provided with the brake device and vibration sensor; and
the controller operates the brake devices provided for the movable parts at different timing, and detects an abnormality of the movable part for which the brake device in operation is provided according to the sensor data obtained from the vibration sensor corresponding to the brake device that is in operation.

9. The abnormality detection apparatus as set forth in claim 1, characterized in that:
the equipment includes a motor for generating a drive force to move the movable part, a reduction gear for reducing a rotation speed of the motor, and the brake device for braking the motor;
the vibration sensor is arranged for the reduction gear; and
the controller calculates a backlash quantity of the reduction gear according to a time difference between a time at which the brake device is started to operate and a time at which the sensor data indicates a peak.

10. The abnormality detection apparatus as set forth in claim 1, characterized in that the controller controls is configured to display on a screen one or more of a name of the movable part, a state of the brake device that is in operation, a vibration attenuation rate that indicates a rate of decrease of vibration of the movable part compared to a past time point, and a determination result that indicates whether or not the movable part is abnormal.

11. An abnormality detection method of detecting an abnormality of equipment according to sensor data that is obtained from a vibration sensor provided for the equipment and is related to a vibration of the equipment, characterized in that:
the equipment includes a movable part that is movable and a brake device that brakes a motion of the movable part; and
according to the sensor data obtained while the brake device is operative, an abnormality of the equipment except for the brake device is detected.

* * * * *